United States Patent [19]

Finger

[11] Patent Number: 4,728,923
[45] Date of Patent: Mar. 1, 1988

[54] STEERABLE WHEEL DIRECTION INDICATOR

[75] Inventor: Eugene P. Finger, Brewster, N.Y.

[73] Assignee: Curtis Instruments, Inc., Mt. Kisco, N.Y.

[21] Appl. No.: 25,182

[22] Filed: Mar. 12, 1987

[51] Int. Cl.$^4$ .............................. B60Q 1/00; B60Q 1/42
[52] U.S. Cl. ..................................... 340/52 R; 340/671; 340/672; 340/686; 116/31; 200/61.54; 74/484 R; 180/6.28; 180/271
[58] Field of Search ................. 340/52 R, 73, 87, 670, 340/671, 672, 686, 687; 180/6.2, 6.28, 271, 141, 142; 116/31; 74/473 SW, 484 R, 491, 492; 200/61.54

[56] References Cited

U.S. PATENT DOCUMENTS

| | | | |
|---|---|---|---|
| 3,936,071 | 2/1976 | Ricketts, Jr. et al. | 340/686 |
| 4,007,357 | 2/1977 | Yanagishima | 340/52 R |
| 4,417,230 | 11/1983 | Fachini et al. | 340/52 R |

Primary Examiner—Donnie L. Crosland
Attorney, Agent, or Firm—John F. Ohlandt

[57] ABSTRACT

The indicator is especially useful for an industrial truck with a steerable wheel which can be turned through a steering arc of as much as one hundred eighty degrees. The indicator includes a potentiometer mechanically coupled to be rotated in synchronism with the steering rotation of the steerable wheel, and a multiple voltage threshold detector circuit connected to receive the variable voltage from the potentiometer and operable to provide one out of N discrete output signals in response to potentiometer voltages which have predetermined voltage level relationships to the respective voltage thresholds. At least N discrete indicator lamps are arranged in an array for indicating steerable wheel direction, and the indicator lamps are connected to receive the discrete output signals from the multiple voltage threshold detection circuit for indicating travel direction.

15 Claims, 7 Drawing Figures

STEERABLE WHEEL DIRECTION INDICATOR

BACKGROUND OF THE INVENTION

This invention is useful for indicating the direction of a steerable wheel in a vehicle, and the invention is particularly useful for that purpose in an industrial truck of the kind which has a steerable wheel which can be turned through a steering arc of as much as 180 degrees.

The invention is especially useful for industrial forklift trucks which are often battery powered, and which are used for bulk materials handling.

Some industrial forklift trucks are especially adapted for operation in very narrow aisles in materials storage warehouses. These trucks commonly employ three wheels, only one of which is steerable, and very frequently the drive motor is connected to drive the steerable wheel, so that the steerable wheel is the only traction wheel. Some design variations may include a fourth wheel which is a freely turnable idler wheel, but which is not a traction wheel and is not actually steerable, or a fourth wheel which is steerable. In such a truck design, in order to enhance maneuverability, the steerable wheel can be turned through an angle of essentially 180 degrees, and the traction motor may be reversed so as to provide for a full 360 degree selection of the steerable wheel travel direction.

The steerable wheel is usually substantially completely hidden beneath the structure of the truck, and the operator frequently stops the truck to pick up or discharge a load. The operator must then rely upon his memory to determine how the truck will move in response to the position of the steerable wheel after stopping to load or unload, or after having taken a break from operation of the truck for any purpose. It is important for the operator to know which direction the steerable wheel is going to travel when he again starts to move the truck because the direction of travel can be quite critical in a narrow aisle in avoiding accidents and damage to stored goods, and in promoting efficient operation. Speed of manipulation is important in promoting total productivity in shifting and moving and storing loads of materials.

Accordingly, there is a real need for an accurate and highly visible and usable steerable wheel travel direction indicator for industrial forklift trucks.

This need has been recognized, and at least one prior attempt has been made to fulfill the need. For instance, see the Houseman et al U.S. Pat. No. 3,900,831 for an "Operation Lamp and Steer Indicator" issued August 1985 and assigned to the Eaton Corporation of Ceveland, Ohio. That patent discloses a steering indicator which is applied to a three wheel forklift truck of the kind mentioned above, and which relies upon a simple mechanical coupling between the steering spindle of the steerable wheel and a rotatable dial type of indicator which carries a rotatable indicator lamp, the indicator lamp serving to indicate the direction of the steerable wheel. That mechanism appears to be effective for its intended purpose. However, the mechanism is quite bulky, and tends to crowd the space within the housing of the truck. Such space is at a premium because the truck is very compact so as to be accommodated easily in narrow aisle spaces. Also, the indicator of the Houseman patent only indicates steerable wheel travel direction for forward directions of wheel travel, and does not accommodate for reverse directions of wheel travel. Furthermore, as pointed out in the Houseman patent, a steerable wheel travel direction indicator is especially important in so-called "order picking" trucks where the operator is positioned upon and controls the vehicle from a platform which travels up and down with the forklift, and which may be located high above the power unit of the vehicle at a time when the vehicle is to be moved. From the standpoint of operator safety, as well as efficient operation, it is important that when the operator platform is located in the elevated position, the operator should not be subjected to movement of the vehicle in an unexpected direction. Thus, it is especially important for the operator to have an indicator for the steerable wheel travel direction in such a vehicle when the operator is in the elevated position. While the Houseman patent is especially directed to that problem, it does not solve that problem particularly effectively, since the operator must look down from his elevated position to the Houseman direction indicator device, which is not elevated with him, and which may be difficult to read with accuracy, particularly if the operator is not farsighted. Accordingly, it is an important object of the present invention to provide an improved steerable wheel travel direction indicator which is very compact, and which is very accurate and effective.

Another object of the invention is to provide an improved steerable wheel travel direction indicator which can be installed at any convenient position for convenient viewing by the operator, such as on an operator platform which is adjustable in height.

Another object of the invention is to provide an improved steerable wheel travel direction indicator which is capable of separately indicating wheel travel direction in either forward steerable directions or reverse steerable directions.

Steerable wheel travel direction indicators have also been proposed for automotive vehicles. One such system is disclosed, for instance, in U.S. Pat. No. 3,673,561 issued to Harry Bronstein on June 27, 1972 for a "Steering Indicator". That steering indicator employs a potentiometer which is mechanically coupled to the steering gear to be positioned according to the direction of the wheels. An electromagnetic meter is connected to receive the signal from the potentiometer and to provide a visual indication of wheel position. In such an apparatus it is difficult to achieve and maintain an accurate calibration. Furthermore, for a very wide angle of wheel direction change, it is difficult to provide a meter with sufficient angular travel to match the angular change in wheel direction.

Accordingly, it is another important object of the present invention to provide an improved steerable wheel travel direction indicator which is extremely accurate, which maintains its calibration, and which is simple and inexpensive and shock resistant.

It is another object of the invention to provide a steerable wheel travel direction indicator which is capable of indicating travel direction over a wide angle of direction change.

Still another prior automotive wheel direction indicator invention is disclosed and described in U.S. Pat. No. 4,342,279 issued Aug. 3, 1982 to Seko et al, for a "Device for Detecting Steering Angle and Direction", and assigned to Nissan Motor Company Limited. The system diclosed in that patent employs directional electromechanical switch elements which are caused to provide pulse signals on different signal lines for left or right turnng movement respectively, and the resultant count is stored in a counter indicator M, the steering angle being registered digitally in the indicator M. The type of display provided by the indicator M is not described.

While this system would appear to be accurate, within the limitations of the counter indicator, and the mechanism limitations, the one-way electromechanical switch elements may be subject to wear and possible erratic operation, and the digital display may be difficult to interpret.

Accordingly, it is another object of the present invention to provide an improved steerable travel direction indicator providing a display which is very easily interpreted, and providing for reliable and trouble free operation.

Further objects and advantages of the invention will be apparent from the following description and the accompanying drawings.

SUMMARY OF THE INVENTION

In carrying out the invention there is provided a wheel direction indicator for a steerable wheel which is especially useful for a vehicle such as an industrial truck of the kind which has a steerable wheel which can be turned through a steering arc of as much as one hundred eighty degrees, said direction indicator comprising a potentiometer mechanically coupled to be rotated in synchronism with the steering rotation of said steerable wheel, a voltage source connected to provide a voltage across said potentiometer, a multiple voltage threshold detector circuit connected to receive the variable voltage from said potentiometer and operable to provide one out of N discrete output signals on one out of N discrete output connections respectively in response to potentiometer voltages which have predetermined voltage level relationships to the respective voltage thresholds, at least N discrete indicator lamps arranged in an array for indicating steerable wheel direction, said indicator lamps being connected to receive said discrete output signals from said multiple voltage threshold detection circuit for indicating travel direction.

DESCRIPTION OF PREFERRED EMBODIMENTS

Figure 1:
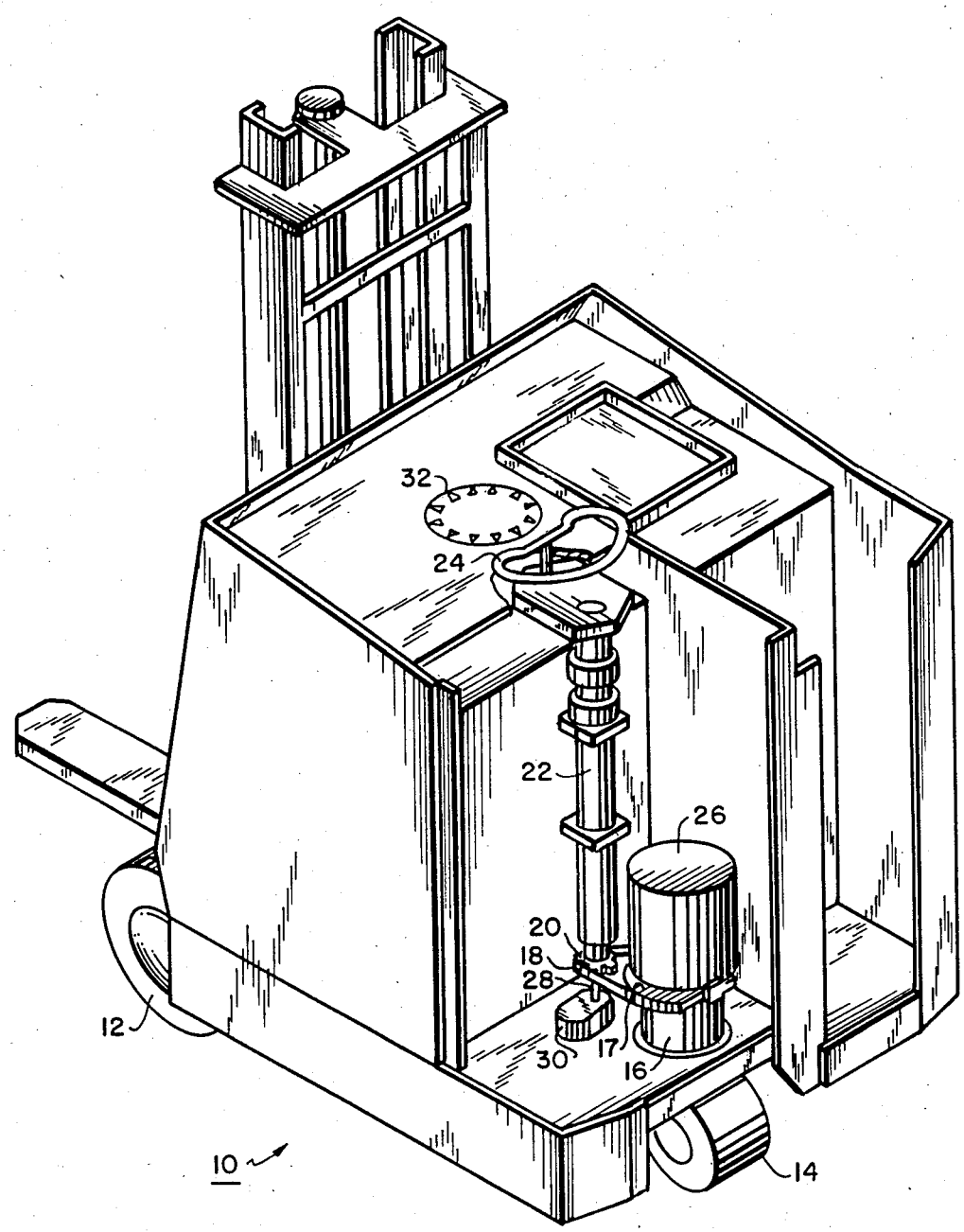
FIG. 1 is a perspective view illustrating the type of forklift truck in which the present invention is particularly useful and generally indicating how the invention may be installed.

Referring more particularly to FIG. 1, there is shown in industrial forklift truck of the type in which the present invention is particularly useful. It includes two front wheels on the forklift side of the truck, as indicated at 12, and a single steerable wheel 14 which is connected and arranged to be steerable through a steering hub 16, a sprocket wheel 17, a chain 18, and a sprocket wheel 20 which is driven through a steering gear assembly 22 from the steering wheel 24.

A motor 26 is preferably connected directly to the spindle 16 and includes a shaft which extends through that spindle to a gear box at the wheel 14 to drive that wheel. In order to simplify the showing in FIG. 1, the housing cover around the motor 26 and the steering gear has been removed, and other components within the housing have been omitted.

In accordance with the present invention, there is provided, as schematically indicated at 28, an extension of the steering gear shaft which carries the sprocket wheel 20 to a gear box 30 which drives a mechanical motion to voltage transducer which may be in the form of an electrical potentiometer. This transducer provides a position signal input to the steerable wheel travel direction indicator in accordance with the present invention. The steering wheel travel direction is indicated to the operator of the truck by a circular rosette of indicator lamps as indicated at 32. The indicator lamps are illuminated one at a time, and may consist of light emitting diodes (hereinafter referred to as LEDs).

Figure 2:
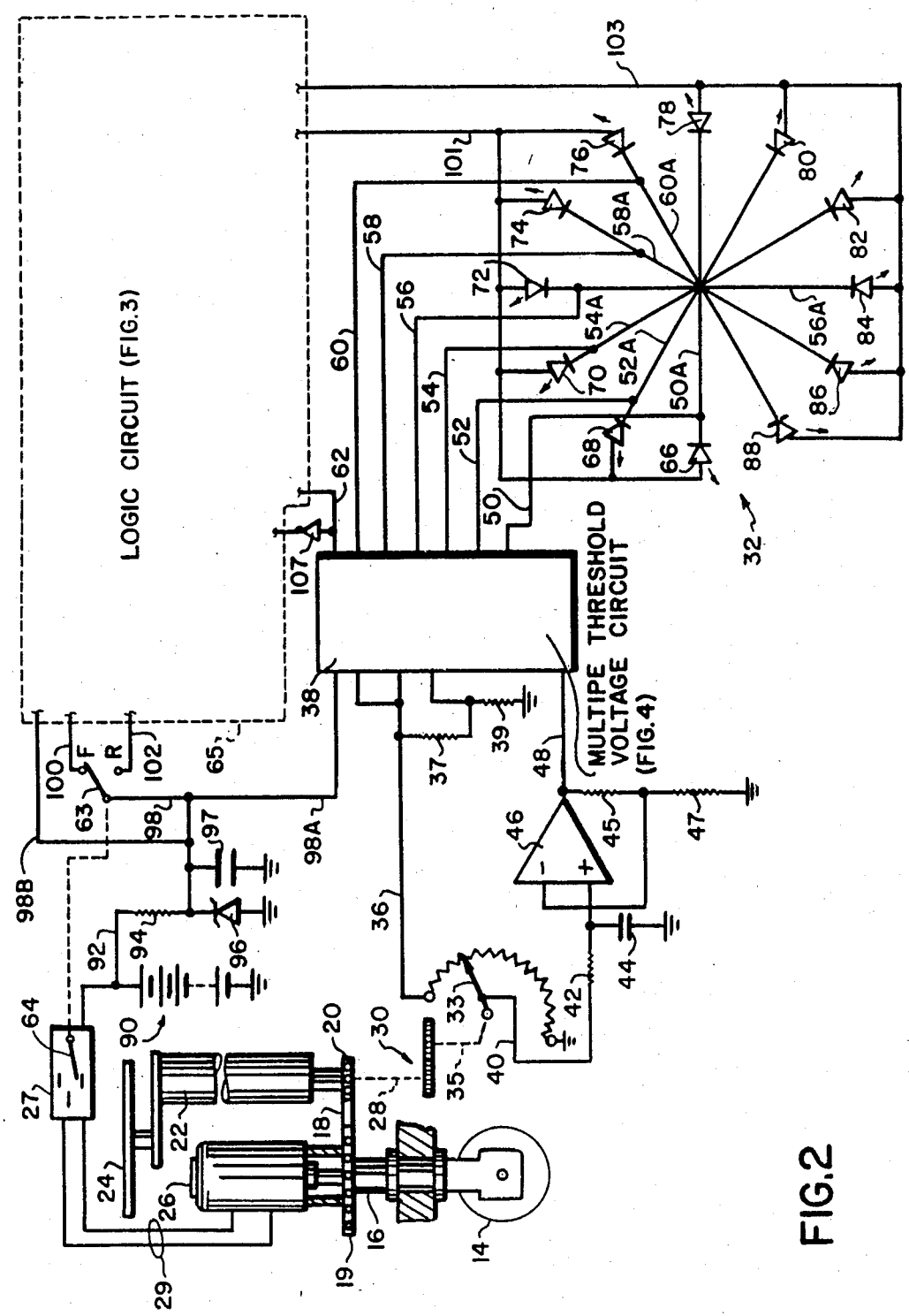
FIG. 2 is a schematic circuit diagram of the invention.

FIG. 2 is a schematic circuit diagram of a preferred embodiment of the entire system of the steerable wheel travel direction indicator in accordance with the presnet invention. At the left of the diagram there is shown the steerable wheel 14 of the vehicle together with steerable wheel spindle 16, the vehicle drive motor 26, the steering wheel 24, the steering gear 22 and the steering gear sprocket 20. As explained in connection with FIG. 1, the steering gear sprocket 20 drives the chain 18 to thus drive the steerable wheel spindle 16 through a larger sprocket wheel 17. The indicator rosette 32 is also shown in FIG. 2 in the lower right corner.

The mechanical direction of the steerable wheel 14 is detected by an extension 28 of the sprocket 20 shaft which drives the set of gears 30 which in turn drive the movable contact 33 of a potentiometer 34 (motion to voltage transducer) through a shaft schematically shown at 35. While shown as a potentiometer which rotates through an angle of only about 180 degrees, in the preferred embodiment of the system, the potentiometer is preferably a multiple turn potentiometer which has a total travel of, for instance, five full rotations from one end to the other. Such a potentiometer provides a high rate of accuracy when the gears 30 are designed to rotate the potentiometer through a substantial part of the total possible potentiometer travel for the full stop-to-stop steering rotation of the steerable wheel. As shown in the drawing, one end of the potentiometer is grounded, and the other end is provided with a standard reference voltage on a connection 36 from a multiple threshold circuit 38. Resistors 37 and 39 are connected and arranged to select and determine the level of the reference voltage provided from the reference voltage source connection 36. The signal from the movable contact of the potentiometer is connected through a connection 40, and through a low pass filter consisting of a series resistor 42 and a shunt capacitor 44 to an operational amplifier 46 which is connected in a standard noninverting amplifier mode. The resistance values of the resistors 45 and 47 of the feedback circuit of the amplifier 46 are selected to provide a desired gain ratio in order to determine the sensitivity of the system to the movement of the potentiometer 34. Amplifier 46 provides an output signal to a signal input connection 48 of the multiple threshold circuit 38.

The multiple threshold voltage circuit 38 is operable to provide one and only one output signal on one of the six output connections 50, 52, 54, 56, 58, and 60 ("one out of N" output). The output is selected by the multiple threshold circuit 38 on the basis of the level of the voltage from potentiometer 34 as amplifed by amplifier 46 and supplied to the input 48 of the multiple voltage threshold circuit 38. the output of the one out of N output leads 50-60, determines which of the LEDs 66-68 of the rosette 32 is to be illuminated. In the preferred embodiment of the invention, the multiple threshold voltage circuit provides outputs at connections 50-60 which each consist of the activation of a constant current sink circuit, and a drop in voltage at the active output. Accordingly, if those output conductors 50-60 are connected to a current source, a current flows to the constant current sink circuit of the active output.

The selection of which of the LEDs in the rosette 32 is to be illuminated is also under control of a forward and reverse switch 63 and a logic circuit 65. The forward and reverse switch 63 is carried by, and operated in conjunction with, the forward and reverse control 64 of a controller 27 for the motor 26. While schematically illustrated as a separate switch, the function of switch 63 is preferably carried out by electrically detecting the voltage changes associated with the operation of the forward and reverse control 64 itself.

The main power supply battery is shown at 90, and supplies power through the controller 27 and electrical connections 29 to the drive motor 26. Battery voltage is also supplied for the steerable wheel travel direction indicator of the present invention through a connection 92 and a voltage regulation circuit including a resistor 94 and a zener diode 96 and a capacitor 97 to the forward-reverse switch 63 through a connection 98. The zener diode 96 preferably limits that voltage to a convenient level such as 7.5 volts. The voltage at 98 is also carried to the multiple voltage threshold circuit 38 through the connection 98A and to logic circuit 65 through connection 98B.

In the indicator rosette 32, the forward LEDs are identified by the numbers 66-76. The reverse LEDs are identified by the numbers 78-88. It should be pointed out that the LEDs 66-88 are illustrated in the drawing as they appear electrically as diodes. If, instead, they were to be shown the way they appear physically in the rosette as in FIG. 1, they would be reversed from the way they are illustrated.

When the switch 63 is in the upward (forward) position, as shown in the drawing, the logic circuit 65 is normally operable to supply a voltage from supply connection 98B through connection 101 to each of the forward LEDs 66-76. Thus, the one out of N signal on the N lines 50-60 is effective to activate only one of the forward indicator LEDs 66-76.

On the other hand, if switch 63 is in the reverse position, the logic circuit 65 is normally operable to supply a voltage from supply connection 98B through connection 103. Then the one out of N signal on threshold circuit outputs 50-60 is operable to illuminate one of the reverse LEDs 78-88 instead of one of the forward LEDs 66-76.

As shown in the drawing, the output connections 50-60 are connected to the diametric interconnections which cross through the rosette. Thus, connection 50 is connected to a diametric connector 50A which interconnects forward LED 66 with reverse LED 78. Similarly, connection 52 is connected to diametric interconnection 52A which interconnects forward LED 68 and reverse LED 80, etc.

It is one of the features of the present invention to provide for an accurate indication of the positin of the steerable wheel, even though the steerable wheel may be rotated through a steering arc of as much as 180 degrees. For instance, the LED 66 is positioned and arranged to indicate a position of the steerable wheel which is 90 degrees to the left of the forward position (far left). LED 66 is connected for actuation from the threshold voltage circuit output 50 corresponding to the 90 degree to the left position of the steerable wheel in conjunction with a supply voltage on connection 101 from the logic circuit 65 indicating a forward position of the forward-reverse switch 63.

However, when the steerable wheel is rotated to a position 90 degrees to the right in the forward direction (far right), the LED 78 should be illuminated. The operation of the logic circuit 65 shifts the supply voltage from connection 101 to connection 103 to accomplish this purpose. The logic circuit 65 responds to an output at 62 from the multiple threshold voltage circuit 38 to accomplish this reversal. The output at 62 represents an angle of rotation in the neighborhood at 180° from the angle previously associated with the output at 50. The output at connection 62 is a voltage representing a logic one signal when the output is active and a logic zero signal when the output is inactive. An inverter 107 is connected to output 62 to provide the inverse of the logic signal from output connection 62 on an output connection 105, both of these signals being supplied to the logic circuit 65.

Figure 3:
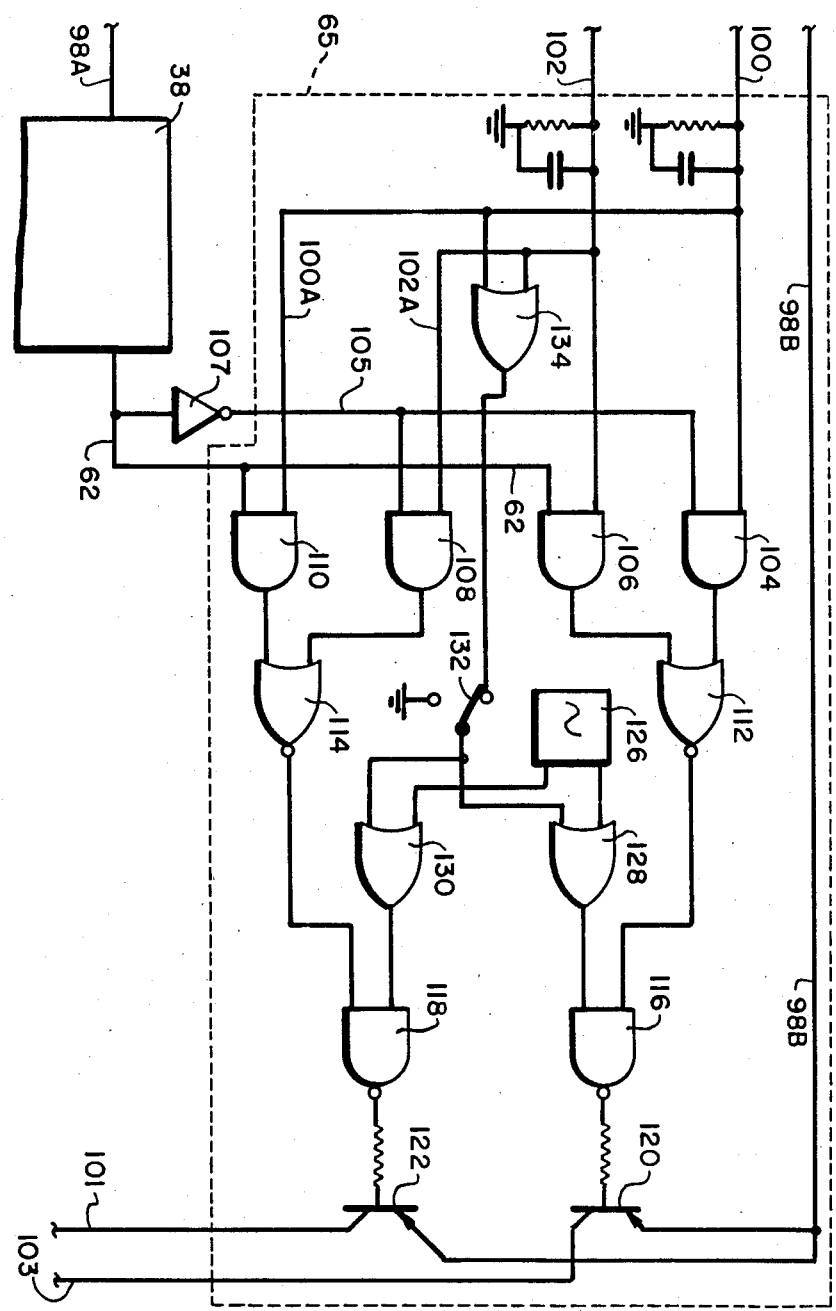
FIG. 3 is a schematic circuit diagram showing the construction and features of a logic circuit which forms a part of the system of FIG. 2.

The logic circuit 65 of FIG. 2 is shown in detail in FIG. 3, and that figure is referred to in the following explanation of logic circuit 65. FIG. 3 repeats some of the components connected to and associated with the logic circuit 65 in FIG. 2 to provide a setting for that circuit.

The logic circuit 65 includes as main essential elements AND gates 104, 106, 108, and 110, NOR gates 112 and 114, NAND gates 116 and 118, and PNP transistors 120 and 122. The forward and reverse lines 1000 and 102 are connected to ground through resistors 123 and 125 so that these lines each go to zero volts (logic 0) whenever they are not provided with a voltage through the lever of switch 63. Capacitors 127 and 129 are connected respectively across the resistors 123 and 125 to provide a low pass filter effect to eliminate voltage spikes.

When an output (logic 1) is available at connection 62 of the multiple threshold voltage circuit, the logical inverse of that output (logic 0) is available on connection 105 to the AND gate 104. This assures a logic zero output from AND gate 104 to NOR gate 112. Concurrently, connection 62 provides a logic one output on connection 105 to the lower input of AND gate 106. However, since the forward-reverse switch 63 is in the forward position, the other input on connection 102 to AND gate 106 is a logic zero. Accordingly, the AND gate 106 provides a logic zero output. Therefore, the NOR gate 112, receiving two logic zero inputs, provides a logic one output to the upper input of NAND gate 115, thus assuring a logic zero output from NAND gate 116 in the presence of a logic one signal on the lower input of NAND gate 116. This switches on transistor 120 to supply a voltage on connection 103 to thus energize LED 78.

In order to establish a control path to the LED 78 through connection 50A, the output connection 50 from the multiple threshold voltage circuit is actiavated by the output 62 within the multiple threshold voltage circuit 38. This feature of the multiple threshold voltage circuit is explained further below in connection with FIG. 4.

When the output is present at 62, AND gate 110 is supplied with a logic one signal on its lower input, and with a logic one input from the forward signal line 100A from switch 63 on its upper input. The result is that there is a logic one output from AND gate 110 to NOR gate 114. The result is a logic zero output from NOR gate 114 to the NAND gate 118. This assures a logic one output from NAND gate 118, turning off transistor 122, so that there is no return path for illumination of LED 66 through connection 101.

With the steerable wheel in exactly the same position, 90 degrees to the right forward, if the forward-reverse switch 63 is shifted to the reverse position, then the LED 66 should be illuminated instead of the LED 78. This again is accomplished by the logic circuit 65. Thus, AND gate 108 is supplied with a logic zero from inverter 107 on connection 105, assuring a logic zero output from AND gate 108, and AND gate 110 is supplied with a logic zero input from forward-reverse switch 63 on connection 100A, assuring a logic zero output from AND gate 110. With two logic zero inputs, NOR gate 114 produces a logic one output to NAND gate 118. Assuming the presence of a logic one input at the other input of NAND gate 118, that gate provides a logic zero output, turning on transistor 112 to provide an activating signal on connection 101 to illuminate LED 66. At the same time, AND gate 106 is provided with logic one inputs on connections 102 and 105, providing a logic one input to NOR gate 112, assuring a logic zero output to the upper input of NAND gate 116, thus assuring a logic one output to the control base of transistor 120, thus deactivating transistor 120 to deactivate the output connection 103.

If the steerable wheel is in the 90 degree to the left forward position, (with threshold output at 50) so that the LED 66 should be illuminated, but the forward-reverse switch 63 is shifted to the reverse position, the LED 78 again should be illuminated instead of LED 66. This is accomplished by the normal operation of the logic circuit 65, without any modification occasioned by an output at 62 of the multiple threshold circuit. Thus, connection 103 is supplied with a voltage rather than connection 101.

From the above explanation, it is apparent that, for each steerable wheel position, one of the LEDs on the appropriate diameter will be illuminated depending upon the position of the forward-reverse switch 63. Thus, for instance, for a steerable wheel angle corresponding to LEDs 70 and 82, LED 70 is illuminated if switch 63 is set at "forward", and LED 82 is illuminated if switch 63 is set at reverse.

The logic circuit 65 is also operable to provide pulsed signals to the LEDs 66-88 to provide pulsed illumination outputs from those LEDs under certain circumstances. The pulses are obtained from an oscillator 117 which provides oppositely phased pulse signals to OR gates 119 and 121. The logic circuit 65 also includes the selector switch 123 and an OR gate 125 related to the pulse function.

The forward-reverse switch 63 is capable of being placed in a neutral position in response to a corresponding neutral position of the controller forward-reverse control 64. When switch 63 is in the neutral position, and selector switch 132 is in the upper position shown, the logic circuit 65 is operable to alternate the actuation of the NAND gates 116 and 118 and the transistors 120 and 122, to cause the oppositely positioned LEDs corresponding to the position of the steerable wheel to flash alternately. Thus, for instance, if the steerable wheel is sixty degrees to the right, corresponding to the diagonal represented by LEDs 76 and 88, the 76 and 88 LEDs will flash alternately until the forward-reverse switch is positioned in a selected forward position to light 76 or a reverse position to light 88 on a steady basis.

In accomplishing this purpose, the OR gate 125 detects the condition when either the forward or the reverse direction has been selected. The result is a logic one carried through selector switch 123 to provide a logic one input to each of the OR gates 119, 121. This assures that there is a logic one output from each of the OR gates to the associated inputs of AND gates 116 and 118 (the condition previously postulated in conjunction with the previous explanations of the operation of the logic circuit 65). Under this circumstance, the oscillator 117 is not operable to change the outputs of either of the OR gates 119 and 121, and is therefore not operable to cause any flashing operation. However, when the forward-reverse switch is in neutral, there is no logic one signal available at either input of the OR gate 125, and accordingly a logic zero signal is always present at the lower input of each of the OR gates 119 and 121. Under these circumstances, the oscillator 117 is operable to cause alternating pulsing logic outputs from the OR gates 119 and 121 which, in the presence of constant logic one signals at the inputs of the other inputs of NAND gates 116 and 118, cause the transistors 120 and 122 to be switched on and off in alternating sequence, to thus cause the members of the opposite pairs of LEDs such as 76 and 88 to flash on and off in an alternating sequence.

Under these circumstances, with forward-reverse switch 63 in neutral, the remainder of the logic circuit 65 does provide continuous logic one signals on the upper input of NAND gate 116 and the lower input of NAND gate 118. The operation is as follows: since there is no logic one signal present at the upper input of any of the AND gates 104, 106, 108, and 110, the logic output of each of these AND gates is logic zero. Thus, both of the NOR gates 112 and 114 have two logic zero inputs, assuring a logic one output.

If the selector switch 123 is shifted to the lower position from the position shown in the drawing, the provide a logic zero to the lower input of each of the OR gates 119 and 121, then those OR gates 119 and 121 are always switched by the outputs from the oscillator 117 to provide pulsed logic ones respectively on the lower input of NAND gate 116 and the upper input of NAND gate 118. This causes the LED or LEDs for the selected direction to flash at all times. When the forward-reverse switch 63 is out of neutral, and in the forward or reverse position, then only the forward or reverse LED flashes. When forward-reverse switch 63 is in neutral, both the forward and reverse LEDs flash as they did for the upper position of the select switch 123.

If it is desired to eliminate any ambiguity between the signals emitted by the system as between the far left and far right forward positions of the steerable wheel, the circuit 65 can be modified to indicate the forward direction for both the neutral and forward positions of switch 63. This can be simply done by disconnecting the forward contact of switch 63 from the conductor 100. Conductor 100 is then fed with a signal from reverse conductor 102 through an invertor. This will cause the indicator lamps 66-78 (LEDs) to flash only in the forward indicating direction for all positions of the switch 63 except reverse, and to flash in the reverse direction only when switch 63 is moved to the reverse position. For the above described operations of the lamps 66-88 in a flashing mode, the oscillator 117 must be operated at a low frequency such as one hertz. If the frequency of the oscillator is adjusted or selected to be above about 40 hertz, or higher, the eyes of the observer cannot detect that a discontinuous flashing is taking place. The result is that, in the "flashing" mode, the lamps appear to be at one half brightness. In the nonflashing mode, they are still at full brightness. This is therefore another different, but useful, way which may be selected to operate the system.

Figure 4:
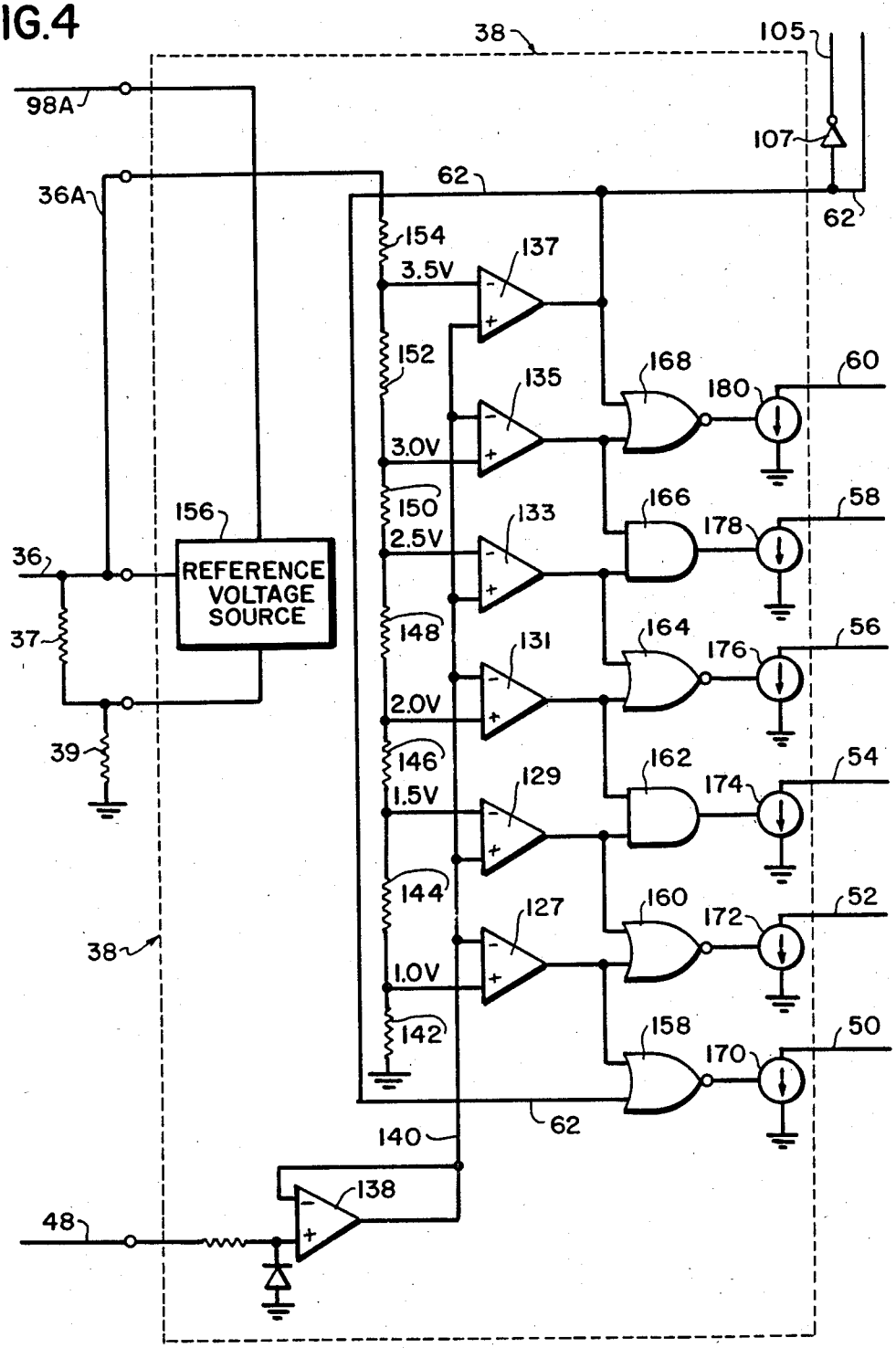
FIG. 4 is a schematic circuit diagram showing the construction and features of a preferred embodiment of a multiple threshold voltage circuit which forms a part of the system of FIG. 2.

FIG. 4 is a schemaic circuit diagram of a preferred embodiment of the multiple threshold circuit 38 of FIG. 2. It basically consists of a series of threshold detection amplifiers 127, 129, 131, 133, 135, and 137. These threshold voltage detection amplifiers are operable in response to the input signal at terminal 48, as buffered by another amplifier 138, and provided on the common input connector 140. In a preferred embodiment, the amplifiers 127-137 are provided with reference voltage levels respectively at 1 volt, 1.5 volts, 2 volts, 2.5 volts, 3 volts, and 3.5 volts by a voltage divider consisting of series connected resistors 142, 144, 146, 148, 150, 152, and 154. The voltage divider is provided with a reference voltage through a connection 36A from a reference voltage source circuit 156 which preferably comprises a part of the multiple threshold voltage circuit. This reference voltage circuit 156 also provides a voltage at connection 36 to the potentiometer 34 of FIG. 2 so that the operation of the potentiometer 34 and the voltage divider 142-154 is always correlated, and no calibration operations are therefore required after an initial accurate setting of the potentiometer in relation to the mechanical position of the steerable wheel 14.

The threshold voltage circuits 127-137 are operable through an OR gate 158, and through AND gates and NOR gates 160, 162, 164, 166, and 168 to control the operation of constant current sink circuits 170, 172, 174, 176, 178, and 180. Each constant current sink circuit 170-180 operates in response to a logic one control input from the associated logic gate to provide a constant current path to ground for the associated output connection 50-60.

The threshold detection amplifiers 127*-137 are arranged and connected so that they alternate in their mode of operation. Thus, threshold amplifier 127 is connected for operation to provide a logic one until its threshold is exceeded, at which time it switches to a logic zero. The threshold amplifier 129 operates in the opposite sense, providing a logic zero until its threshold is exceeded, at which time it delivers a logic one. Similarly, comparator amplifier 131 and comparator amplifier 135 operate in the same mode as comparator amplifier 127, switching from a logic one to a logic zero output as their respective thresholds are exceeded. Comparator amplifiers 133 and 137 oprerate in the same mode as comparator amplifier 128, switching from a logic zero to a logic one output as the associated threshold is exceeded.

The operation of the logic gates 158-168 may be explained as follows:

When the input signal on connection 48 is below the lowest threshold (1 volt at the reference input of comparator amplifier 126), the output of that amplifier is a logic one at connection 182. This assures that there is a logic one input to OR gate 158, which assures that the constant current sink circuit 170 is activated with a logic one input. In the meantime, there is not logic one input on the lower input connection of OR gate 158 since that input is derived from the output of threshold amplifier 137, which has a logic zero output until its threshold is exceeded. Accordingly, as soon as the signal voltage increases above the level of 1 volt, switching the threshold amplifier 127 output to a logic zero, the OR gate 158 is deactivated, deactivating the constant current sink circuit 170. At the same time, the NOR gate 160 is switched to provide a logic one activating output to the constant current sink circuit 172 because the output of threshold amplifier 127 goes to a logic zero, and the output of threshold amplifier 129 continues at a logic zero output at connection 186. Therefore, only the current sink circuit 172 is actuated of the complete set of sink circuits 170-180.

When the voltage is increased further, above the threshold of threshold amplifier 129, then the resultant logic one output from 129 switches off the NOR gate 160 and switches off the sink circuit 172 while switching on the AND gate 172 and the sink circuit 174. AND gate 162 is switched on because the next threshold voltage circuit 130 continues to provide a logic one signal at connection 188 until its threshold voltage of 2 volts is exceeded. Thus, until that occurs, AND gate 162 is activated to activate sink circuit 174. When the threshold voltage of 2 volts is exceeded, the threshold amplifier 131 is operable to provide a logic zero output at 188, activating NOR gate 164, and deactivating AND gate 162. In similar fashion, the switching of threshold voltage circuit 133 at connection 190 activates AND gate 166 and deactivates NOR gate 164, and the switching of threshold voltage circuit 135 at connection 192 deactivates AND gate 166 and activates NOR gate 168 as their respective voltage threshold are exceeded.

Finally, when the threshold voltage of 3.5 volts is exceeded, threshold amplifier 137 is activated to provide a logic one output at connection 62 that deactivates NOR gate 168 to turn off the sink circuit 180. This logic one output is also provided on connection 62 to the lower input of OR gate 158 to provide an enabling input to sink circuit 170. This is appropriate because an output is required on connection 50 for this extreme position of the steerable wheel as previously explained in conjunction with FIGS. 2 and 3. This logic one output from 137 is also supplied at connection 62 to logic circuit 65 to control the operation of that circuit as described above in connection with FIG. 3.

Figure 5:
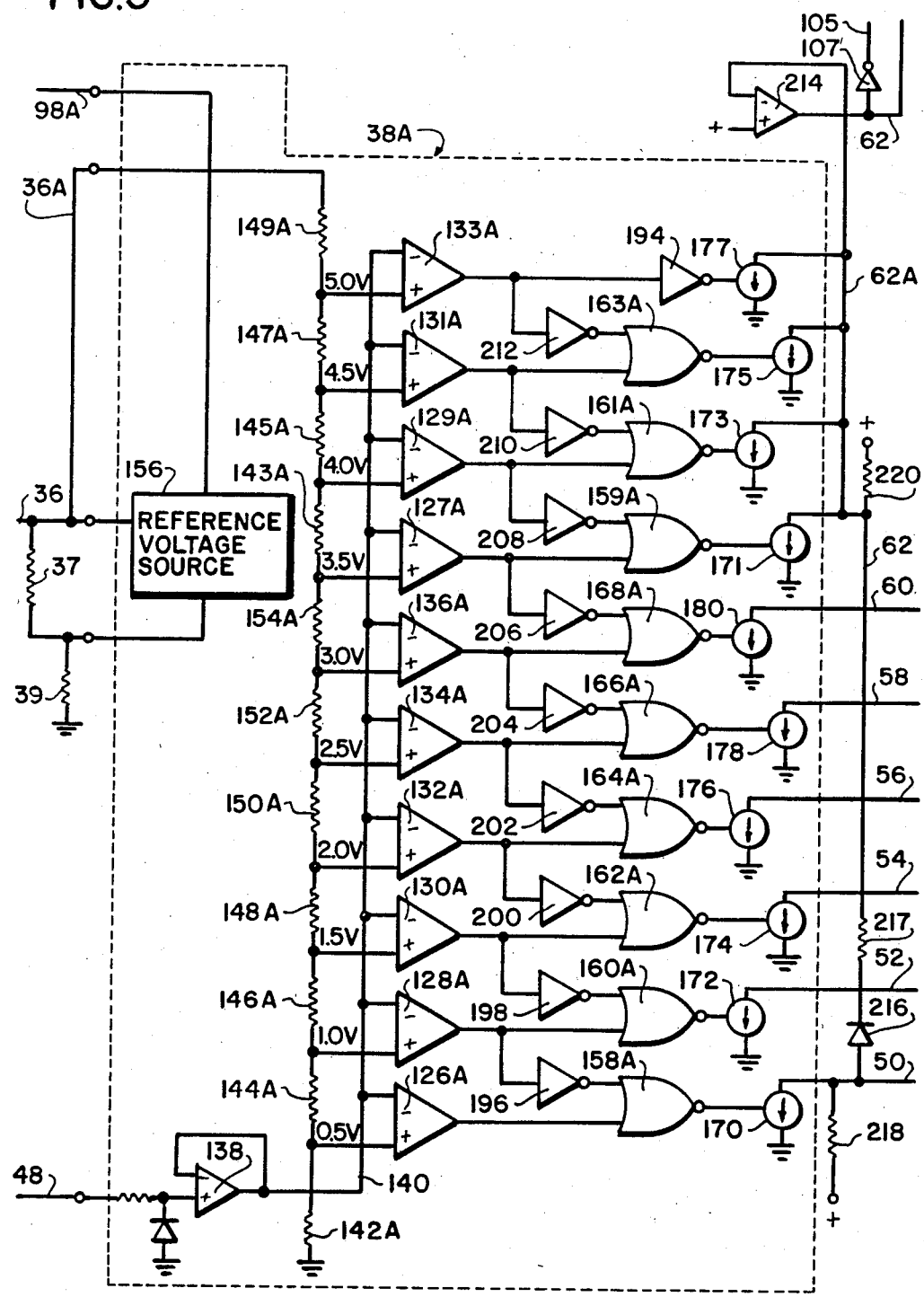
FIG. 5 is a schematic circuit diagram showing the construction and features of an alternative embodiment of the multiple threshold circuit which forms a part of the systems of FIG. 2.

FIG. 5 is a schematic circuit diagram corresponding to FIG. 4, but showing a modified version 38A of the multiple threshold voltage circuit 38 which may be substituted in the system of FIG. 2. FIG. 5 also includes several additional components which are required exterior to the multiple threshold voltage circuit 38A for proper operation of the circuit. These will be described more fully below.

In lettering the components in FIG. 5, those components which are substantially identical to corresponding components in FIG. 4 have been given the same numbers. Those which are similar in function and position but which are actually different are given similar numbers with a suffix letter A. Additional components which are required in the embodiment of FIG. 5, and which were not required in FIG. 4, have been assigned odd numbers with the suffix letter A which fall in the same numerical range as numbers previously used for similar components in FIG. 4.

The operation of the system of FIG. 5 is very similar to that of FIG. 4 in many ways. However, the multiple threshold voltage circuit 38A of FIG. 5 includes ten different threshold voltage amplifiers which are designated 126A through 136A plus 127A, 129A, 131A, and 133A. These amplifiers are connected to a reference voltage resistor divider network, the members of which are designated by the even numbers 144A–154A and the odd numbers 143A–149A which preferably sense voltage levels at ½ volt intervals from 0.5 volts to 5 volts. The outputs of these amplifiers are all connected in exactly the same way. Thus, the reference voltage is always connected to the noninverting input of the amplifier, and the input voltage signal from connection 140 is connected to the inverting input of each amplifier. Accordingly, each amplifier delivers a logic one output when its voltage reference threshold is not exceeded, and a logic zero output after its voltage reference threshold is exceeded. The threshold voltage comparator amplifiers 126A–136A, 127A–133A operate, together with the inverters 196–212 and the NOR gates designated by the even numbers 158A–168A and by the odd numbers 159A–163A to control the operation of the constant current sink circuits designated by the even numbers 170–180 and by the odd numbers 171–175. A final constant current sink circuit 177 is controlled directly from the threshold circuit 133A and an inverter 194.

The operation of the circuit to produce a "one-out-of-N" output at each of the output terminals 50–60 under the control of the input voltage level may be explained as follows:

Initially, if the input voltage is below all of the thresholds of all of the multiple threshold amplifiers 126A–136A, 127A–133A, then all of the amplifiers produce logic one outputs. This assures that all of the NOR gates 158A–168A, 159A–163A receive a logic one input from the associated amplifiers resulting in a logic zero control output to the associated current sink circuits. The same statement applies of course to the operation of inverter 194 in response to the logic one output from comparator amplifier 133A. However, as soon as the threshold of amplifier 126A is exceeded, the output of that amplifier switches to logic zero, resulting in a logic zero on the lower input of NOR gate 158A. Since the output of comparator amplifier 128A is still a logic one, inverter 196, which is connected to receive that logic one output from amplifier 128A, supplies a logic zero to the upper input of NOR gate 158A. Under these circumstances, the NOR gate 158A provides a logic one output to the current sink circuit 170, activating only that one current sink circuit. However, as soon as the threshold of one volt at amplifier 128A is exceeded, that amplifier also switches to a logic zero output. The inverter 196 then provides a logic one input to NOR gate 158A, causing current sink circuit 170 to deactivate. At the same time, since the inputs to NOR gate 160A are now both logic zero, the result is a logic one control signal to the current sink 172, causing only that one current sink circuit to be actuated. The operation of the circuit continues, as the input voltage rises, to switch on, or activate, only one current sink circuit at a time. If the input voltage at connection 40 is reversed, the operation is reversed. Thus, the voltage level from the input connection 140 determines which one, and only one, of the current sink circuits is activated. It must be emphasized that in the preferred operation of the present invention, the input voltage signal is never below 0.5 volts or above 5.0 volts, so that one of the current sinks 170–180, 171–177 is always activated.

In the embodiment of FIG. 5, since the multiple threshold voltage circuit 38A includes ten different threshold voltage levels, and only seven are required, the four highest level current sink outputs are tied together to provide the seventh output level, as indicated at 62A. In order to isolate the operation of the logic circuit 65 (of FIG. 3) from constant current sink circuits 171–177 connected to output connection 62A, an inverting buffer amplifier 214 is provided between the output 62A and the output connection 62 to the logic circuit 65.

As previously explained in connection with the operation of the system of FIG. 2 and FIG. 3, when the seventh threshold voltage level is changed, the output connection 50 to the first level must again be activated. In the embodiment of FIG. 5, this is accomplished by an auxiliary connection 62B from output 62A, and through a resistor 217 and a diode 216 to the output 50. The diode 216 is provided to isolate the output 62A from the output 50. Thus, when the output 50 goes down (activated) the diode 216 prevents input 62A from going down with it. Otherwise, the activation of output 50 would unintentionally activate the logic circuit 65 through connections 62 and 105. However, the diode 216 does not prevent the activated output at 62A to activate the output 50 for the purpose of providing a return circuit for the LEDs 66 and 78 associated with the output 50.

In order to enhance the switching of diode 216, and to provide for position control by output 62A of output 50, both sides of the diode 216 are normally held at a positive voltage by means of voltage biasing circuits respectively including resistors 218 and 220.

One important virtue of the embodiment 38A of the multiple threshold voltage circuit is that it is available, at least in a functionally equivalent form, as a standard circuit chip from National Semiconductor Corporation, Santa Clara, Calif., under the product designation LM3914 "Dot/Bar Display Driver". Accordingly, this commercial chip provides a very convenient and economical mode for implementing this part of the present invention.

It is apparent from the above description of multiple threshold circuit 38A that there are three more outputs than are really required, and that those three extra outputs from sink circuits 173, 175, and 177 are simply tied together with the output from sink circuit 171 at 62A. It will be apparent that, instead of tying outlets together in common at the upper end of the stack of threshold circuits, as shown, the upper end outputs can be fully utilized, and four outputs at the lower end can be tied together in common instead. Alternatively, two outputs can be tied together at the bottom and three outputs together at the top or vice versa. In any of these arrangements, the extra levels at the end or ends of the circuit, having their outputs tied together, simply provide protection against having an unlit display if the input signal potentiometer 34 is not properly adjusted and is caused to overtravel beyond the end of the correct travel range.

Figure 6:
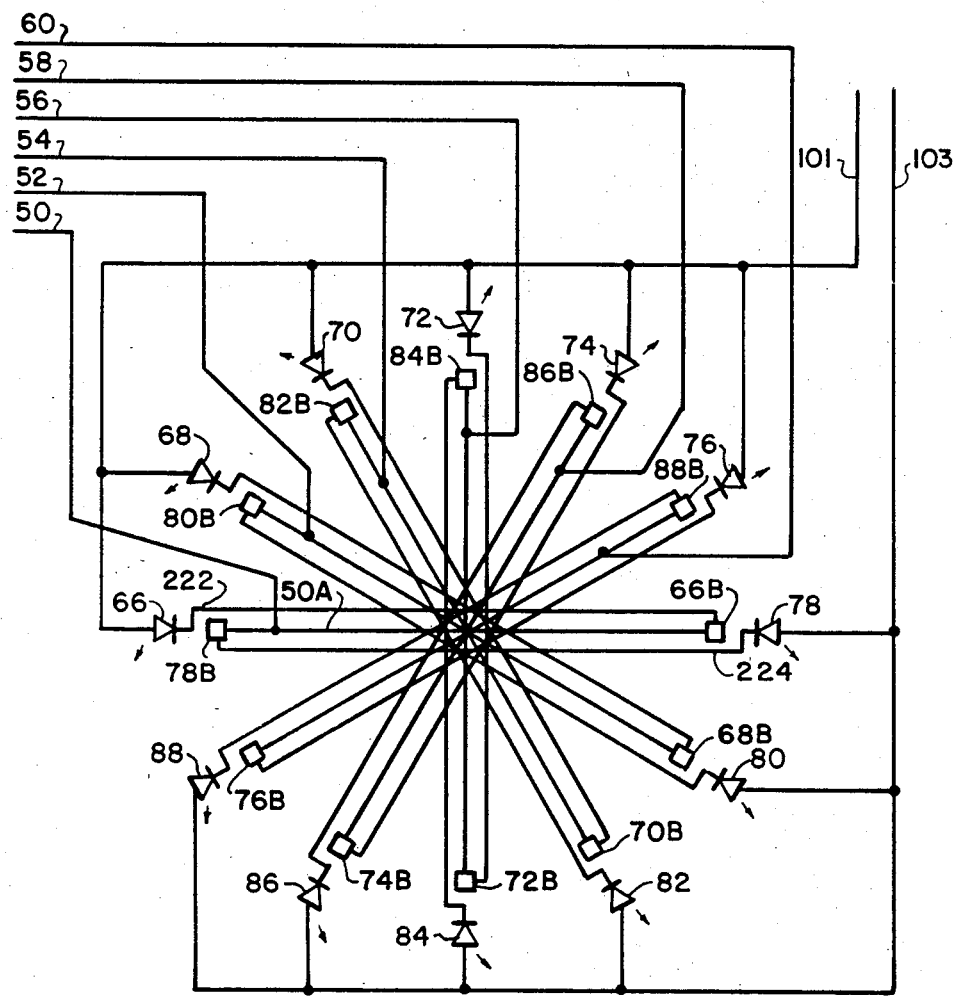
FIG. 6 is a schematic circuit diagram illustrating an alternative display arrangement which may employed in the system of FIG. 2.

FIG. 6 is a partial schematic circuit diagram illustrating an alternative rosette display arrangement of light emitting diodes which may be substituted in the system of FIG. 2. The connection and arrangement of the light emitting diodes is substantially the same as in the rosette illustrated in FIG. 2 with the exception that a second light emitting diode is connected in series with each of the previously described light emitting diodes. The previously described LEDs are designed to appear as direction pointers or arrows. The added LEDs are respectively operable to appear, when lighted, as the opposite end of the associated pointer, or the opposite end of the arrow indicted by that pointer. Thus, opposite the pointer LED 66, there is a "tail" LED 66B. Similarly, opposite the pointer LED 68, there is a "tail" LED 68B, and for each of the other pointer LEDs, there is an opposite "tail" LED which bears the same number with a subscript B added. The members of each associated pair of LEDs are connected in series to be illuminated at the same time. Thus, LED 66 is connected by the conductor 222 in series with LED 66B. LED 66B is then connected to the common cross connection 50A which is connected to the constant current sink output connector 50. Thus, LED 66 and LED 66B are energized and illuminated under circuit operating conditions which would have energized and illuminated LED 66 in the embodiment of FIG. 2. This assumes energization through connection 101 of the logic circuit 65. If, instead, the energization is through connection 103, then LED 78 is energized and illuminated as before, but now the LED 78B is also illuminated through the connection 224 from LED 78 to LED 78B. Preferably, in addition to having different display shapes, the LEDs for the pointers and the LEDs for the tails have different display colors. Thus, the pointer LEDs may be designed to emit green illumination, and the tail LEDs, such a 66B, may be designed to emit red illumination.

Based on the above explanation, it is quite evident that each of the other sets of LEDs will operate in a manner similar to that described for the LEDs 66, 66B, and 78, and 78B.

Figure 7:
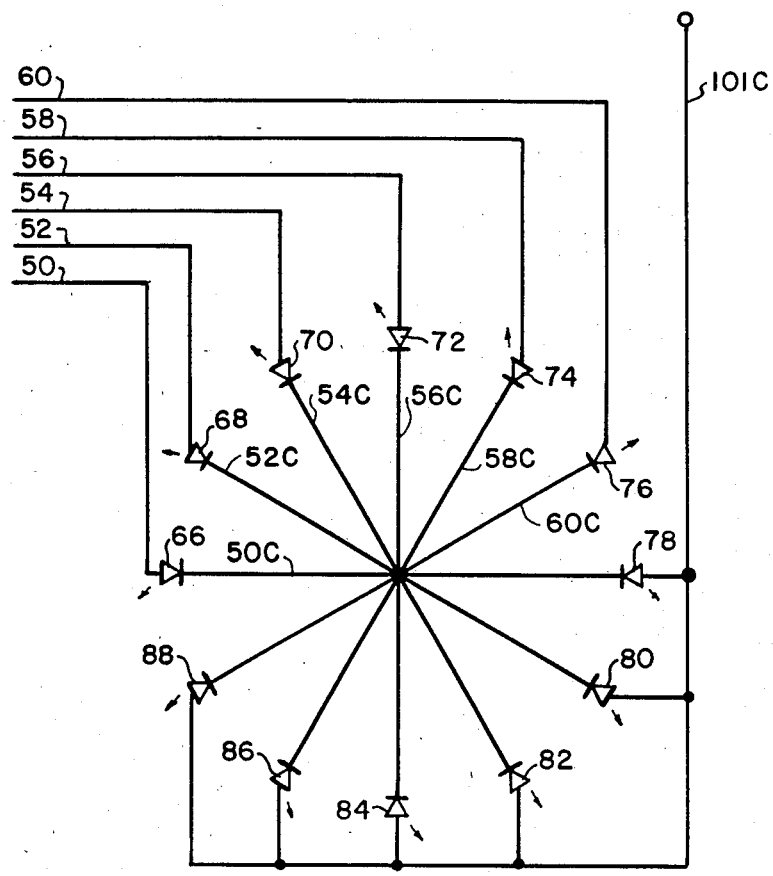
FIG. 7 is a schematic circuit diagram illustrating another alternative mode of connection for the display arrangement which may be employed in the system of FIG. 2.

FIG. 7 is a schematic circuit diagram illustrating another alternative mode of connection for the display arrangement which may be employed in the system of FIG. 2. In the system of FIG. 7, there is no differentiation between forward and reverse in the display at the rosette. Thus, the LEDs 66 and 78 are always connected in series and are illuminated together to indicate the direction of the steerable wheel. Similarly, LEDs 68 and 80 are always illuminated together, as are each of the other diagonally opposite members of each diagonally opposite pair of LEDs. This does not provide such precise information as to the direction of wheel travel, but it does indicate how the steerable wheel is aligned, and provides a basis for knowledge as to which way the wheel will travel, assuming the operator remembers whether he has switched the drive motor into forward or reverse. The rest of the system for the embodiment of FIG. 7 can be identical to that described above in connection with FIGS. 2 and 4, with the exception that the logic circuit 65 is completely omitted, and current is supplied from a single common supply line 101C at all times. Thus, the forward and reverse information, and the switching of the LEDs in response to forward and reverse information is completely eliminated in the embodiment of FIG. 7.

In still another possible embodiment, not shown, the rosette of FIG. 7 may be further modified to omit as many as half of the LEDs. For instance, if LEDs 78, 80, 82, 84, 86, and 88 are omitted, and the current source circuit from 101C is completed to the respective associated LEDs 66–76, the display will operate in the same manner as in FIG. 7, but will illuminate only one end of each diameter of the rosette to indicate the angle of wheel alignment.

When the steerable wheel direction indicator of the present invention is installed on a vehicle, the only requirement for calibration to align the operation of the steerable wheel indicator with the actual direction of the wheel is to make sure the alignment is correct for one point in the travel of the movable contact 33 of the potentiometer 34 shown in FIG. 2. Thus, the connection between the shaft 35 and the movable contact 33 can be loosened, and then tightened after adjustment so that the movable contact 33 always moves accurately and positively with the rotation of shaft 35.

One of the simplest procedures is to mechanically align the steerable wheel in the forward position, a position which should cause the indicator light (LED) 72 to be illuminated if the steerable wheel direction indicator is properly adjusted. The position of the movable contact 33 of the potentiometer 34 is then adjusted while the connection to the shaft 35 is loose until that indicator light 72 operates. To further define the position, the movable contact 33 may be rotated back and forth to determine the arc of rotation which maintains the straight forward indicator light 72 on. The movable contact 33 is then moved to the center of that arc, and the connection to operating shaft 35 is tightened. Then, assuming that the gain of the amplifier 46 has been properly selected by the selection of resistors 45 and 47, the system operates very accurately, without further calibration or adjustment.

The trouble free and error free operation is enhanced and achieved by a combination of factors. One of these factors is that the amplifier 46 is designed to avoid any current load on the potentiometer 34 so that no calibration error arises because of the current drawn through the movable contact 33 to the amplifier 46. The other major important factor is that, as previously mentioned, the reference voltages for the multiple threshold voltage circuit 38, and for the potentiometer 34 are supplied from the same reference voltage source on connection 36. Thus, even if the voltage from that reference voltage source varies during the course of the operation of the circuit, the signal from the potentiometer 34 varies in synchronism with the variation of the reference voltages within the threshold voltage circuit with which that signal is being compared. Accordingly, no error in operation of the system results from such voltage variation.

The above factor also provides a substantial flexibility in the selection of the potentiometer 34. Thus, the total resistance value of the potentiometer 34 is not critical, and may be at any value from 2,000 ohms to 10,000 ohms or more. Furthermore, the design of the potentiometer 34 is not critical. Thus, potentiometers providing one turn, three turn, five turns, or ten turns may be employed, as long as the drive of the gear set 30 is designed to provide the appropriate travel of the movable potentiometer contact 33 over a substantial portion of the movable potentiometer 34 for the total lock-to-lock movement of the steerable wheel 14.

It will also be understood that other mechanical motion to voltage transducers may be employed such as variable transformers or photo-optical systems with movable mask elements in place of the potentiometer. However, the potentiometer is the preferred transducer.

It will be understood that the gear train 30 may be omitted if the rotation of the steering gear drive sprocket 20 is appropriate for driving the movable contact 33 of potentiometer 34. In such case, the potentiometer contact 33 may be driven directly from the shaft extension 28.

This disclosure has dealt with this invention entirely in terms of providing twelve different indicator lamps or sets of lamps (LEDs) in the direction indicator rosette. However, it will be obvious that other numbers of indicator lamps may be provided, preferably in pairs being diametrically opposite members. For instance, 10, 14, or 16 lamps could be employed if desired. In such an embodiment, a different number of multiple threshold voltage circuit levels would be employed. Furthermore, while the present disclosure has been confined to embodiments which provide equal angular spacing between adjacent indicator lamps 66–88, and equal voltage steps in the reference voltages employed with the multiple threshold voltage circuit 38, it will be apparent that, if desired, unequal angular spacings could be employed with corresponding unequal reference voltage steps within the multiple threshold circuit 38.

The indicator lamps 66–88 have been described as triangular, arrowhead-shaped display devices. It will be understood that other shapes may be employed, if desired, and that the arrowhead, or other desired shape, may be obtained by simply employing a suitable mask over conventional LEDs.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

I claim:

1. A wheel direction indicator for a steerable wheel which is especially useful for a vehicle such as an industrial truck of the kind which has a steerable wheel which can be turned through a steering arc of as much as one hundred eighty degrees, said direction indicator comprising a mechanical motion to voltage transducer mechanically coupled to be rotated in synchronism with the steering rotation of said steerable wheel, a multiple voltage threshold detector circuit connected to receive the variable voltage from said transducer and operable to provide one out of N discrete output signals on one out of N discrete output connections respectively in response to transducer voltages which have predetermined voltage level relationships to the respective voltage thresholds, at least N discrete indicator lamps arranged in an array for indicating steerable wheel direction, said indicator lamps being connected to receive said discrete output signals from said multiple voltage threshold detection circuit for indicating travel direction.

2. A wheel direction indicator as claimed in claim 1 wherein there are provided at least 2N discrete indicator lamps arranged in a substantialy circular array for indicating steerable wheel direction.

3. A wheel direction indicator as claimed in claim 2 wherein said indicator lamps are arranged in pairs with the members of each pair being arranged at opposite ends of a common diameter, the members of each pair being connected in series to be energized and illuminated concurrently for indicating the direction of alignment of the steerable wheel.

4. A wheel direction indicator as claimed in claim 2 wherein said mechanical motion to voltage transducer comprises a potentiometer with a voltage source connected to provide a voltage across said potentiometer.

5. A wheel direction indicator as claimed in claim 2 wherein said voltage source connected to provide a voltage across said potentiometer is a common reference voltage source for supplying a voltage to said multiple threshold voltage circuit as well as to said potentiometer.

6. A wheel direction indicator as claimed in claim 5 wherein a voltage buffer amplifier is connected between said potentiometer and said multiple threshold voltage circuit to provide variable voltage input signals from said potentiometer to said multiple threshold voltage circuit while minimizing the current load on said potentiometer.

7. A wheel direction indicator as claimed in claim 6 wherein said multiple threshold voltage circuit comprises a plurality of individual voltage comparator amplifiers each connected to receive the variable input voltage on one terminal thereof, each of said amplifiers being connected to receive a reference voltage on the other terminal thereof with the reference voltage applied to each amplifier being different from that applied to every other amplifier, said multiple threshold voltage circuit including one constant current sink circuit for the outputs thereof, said amplifiers being connected through logic gates to control individual ones of said constant current sink circuits, the output connections of said respective constant current sink circuits constituting the output signals from said multiple voltage threshold detector circuit to said discrete indicator lamps.

8. A wheel direction indicator as claimed in claim 7 wherein said voltage comparator amplifiers are operational amplifiers and wherein said voltage comparison amplifiers are connected in an alternating polarity sequence from the lowest to the highest threshold voltage comparison amplifers so that the lowest threshold voltage comparison amplifier provides a logic one output below its threshold and a logic zero output above its threshold and the next higher voltage comparison amplifier provides a logic zero output below its threshold and a logic one output above its threshold and so on in an alternating sequence, said logic connections between said voltage threshold comparison amplifiers and said constant current sinks comprising a combination of an OR gate for the lowest voltage level output and an alternating sequence of NOR gates and AND gates for higher voltage level outputs to provide for one out of N outputs from said multiple threshold voltage circuit, the highest threshold voltage comparison amplifier being operable to produce a logic one when its threshold is exceeded, a connection from the output of said lastnamed amplifier to the OR gate associated with said lowest order constant current sink circuit to thereby provide an output from said multiple threshold voltage circuit on said lowest level constant current sink circuit for both the lowest level and the highest level voltage inputs to thereby provide signals to either the far left or the far right indicator lamps for both the far left and far right positions of said steerable wheel.

9. A wheel direction indicator as claimed in claim 2 wherein there is provided a motor drive direction reversal control means connected to control motor direction, a circuit connected to receive drive direction signals from said direction reversal control means and operable in conjunction with said discrete output signals from said multiple voltage threshold detection circuit to produce 2N discrete outputs to said 2N discrete indicator lamps for indicating steerable wheel travel directions in forward and reverse.

10. A wheel direction indicator as claimed in claim 9 wherein the steerable wheel can be turned through an arc of 180 degrees so as to be aligned at 90 degrees to the left or 90 degrees to the right of the forward direction, and wherein one pair of indicator lamps is lined up on a diameter which is 90 degrees from the forward direction to indicate the far left or far right position of the steerable wheel, said circuit connected to receive drive direction signals from said direction reversal control means and operable in conjunction with said discrete output signals from said multiple voltage threshold detection circuit comprising logic circuit which is operable to receive from said threshold detection circuit different discrete output signals for the far left and far right positions of said steerable wheel respectively from said multiple threshold voltage circuit, said logic circuit being operable in response to said far left and far right signals and in response to forward and reverse signals from said direction reversal control means to determine whether the far left or far right indicator lamp is to be energized so as to distinguish each of the four conditions far right forward, far right reverse, far left forward, and far left reverse from one another through the operation of said lamps.

11. A wheel direction indicator as claimed in claim 10 wherein said logic circuit is connected to provide power on two separate drive lines, one of said drive lines being connected to all of said indicator lamps which are normally operable to indicate a forward wheel travel direction and a far left or far right travel direction and the other one of said drive lines being connected to provide current to all of said indicator lamps which are operable to indicate a reverse wheel travel direction at the other one of said far left or far right indicator lamps.

12. A wheel direction indicator as claimed in claim 10 wherein said indicator lamps are arranged in diametrically oppositely positioned pairs and wherein said direction reversal control means comprises a forward-reverse switch, and wherein said forward-reverse switch has a neutral position in which neither forward or reverse is selected, said logic circuit including an oscillator, and said logic circuit being operable in response to the neutral position of said forward-reverse switch and the output of said oscillator to control the delivery of power to said indicator lamps to cause the two diametrically opposite indicator lamps which most nearly indicate the alignment of the steerable wheel to flash in alternating sequence.

13. A wheel direction indicator as claimed in claim 9 wherein 4N indicator lamps are provided and wherein four of said lamps are aligned along each direction-indicating diameter of said array of lamps, two of said lamps being arranged and connected to be energized and illuminated on each diameter for each direction of said steerable wheel along that diameter, each member of each pair of said lamps which is illuminated concurrently having a member which is distinct from the other in order to distinguish the indication of wheel travel in the forward or reverse direction.

14. A wheel direction indicator as claimed in claim 1 wherein said indicator lamps are light emitting diodes.

15. A wheel direction indicator as claimed in claim 4 wherein said potentiometer is a multiple turn potentiometer.

* * * * *

UNITED STATES PATENT AND TRADEMARK OFFICE
CERTIFICATE OF CORRECTION

PATENT NO. : 4,728,923

DATED : March 1, 1988

INVENTOR(S) : Eugene P. Finger

It is certified that error appears in the above-identified patent and that said Letters Patent is hereby corrected as shown below:

| | | |
|---|---|---|
| Column 6, | line 34, | "at" should read --of--. |
| Column 7, | line 5, | "115" should read --116--. |
| Column 7, | lines 54-55, | ", the LED" should read --, then LED--. |
| Column 9, | line 62, | "127*-137" should read --127-137--. |
| Column 10, | line 18, | "not" should read --no--. |
| Column 10, | line 38, | "172" should read --162--. |
| Column 12, | line 11, | "40" should read --140--. |
| Column 12, | line 48, | "position" should read --positive--. |
| Column 13, | line 47, | "such a" should read --such as--. |
| Column 17, | line 30, | after "comprising ", insert --a --. |

Signed and Sealed this

Twenty-fifth Day of October, 1988

Attest:

DONALD J. QUIGG

*Attesting Officer*       *Commissioner of Patents and Trademarks*